US009457473B2

(12) United States Patent
Rudakevych (10) Patent No.: US 9,457,473 B2
(45) Date of Patent: Oct. 4, 2016

(54) SUSPENDED ROBOT SYSTEMS AND METHODS FOR USING SAME

(71) Applicant: iRobot Corporation, Bedford, MA (US)

(72) Inventor: Pavlo Rudakevych, San Luis Obispo, CA (US)

(73) Assignee: iRobot Corporation, Bedford, MA (US)

( * ) Notice: Subject to any disclaimer, the term of this patent is extended or adjusted under 35 U.S.C. 154(b) by 223 days.

(21) Appl. No.: 13/921,882

(22) Filed: Jun. 19, 2013

(65) Prior Publication Data

US 2013/0345876 A1 Dec. 26, 2013

Related U.S. Application Data

(60) Provisional application No. 61/662,178, filed on Jun. 20, 2012.

(51) Int. Cl.
| | | |
|---|---|---|
| G05B 19/04 | (2006.01) | |
| G05B 19/18 | (2006.01) | |
| B25J 9/16 | (2006.01) | |
| B25J 9/10 | (2006.01) | |

(52) U.S. Cl.
CPC .............. *B25J 9/1697* (2013.01); *B25J 9/104* (2013.01); *G05B 2219/40273* (2013.01); *G05B 2219/40425* (2013.01)

(58) Field of Classification Search
CPC ...... B25J 9/1697; B25J 19/023; B25J 9/104; G05B 2219/40273; G05B 2219/40425
USPC ........................................................ 700/259
See application file for complete search history.

(56) References Cited

U.S. PATENT DOCUMENTS

| | | | | | |
|---|---|---|---|---|---|
| 3,300,954 | A | * | 1/1967 | Barnes ................. | A01D 45/263 47/1.7 |
| 3,460,330 | A | * | 8/1969 | Black, Jr. ............. | A01D 46/005 56/328.1 |
| 3,635,004 | A | * | 1/1972 | Webb .................... | A01D 46/24 239/743 |
| 4,519,193 | A | * | 5/1985 | Yoshida ................ | A01D 46/24 348/89 |
| 4,663,925 | A | * | 5/1987 | Terada .................. | A01D 46/24 382/153 |
| 4,718,089 | A | * | 1/1988 | Hayashi ................ | G01J 3/46 348/592 |
| 4,809,425 | A | * | 3/1989 | Monforte ............. | B23P 21/002 29/26 A |

(Continued)

FOREIGN PATENT DOCUMENTS

WO    WO 2009058041 A2 *  5/2009  .............. H02G 1/02

OTHER PUBLICATIONS

"What is GardenBot," GardenBot, Retrieved Date: May 16, 2012, From URL:http://gardenbot.org (48 pages).

(Continued)

*Primary Examiner* — Harry Oh
(74) *Attorney, Agent, or Firm* — Myers Bigel & Sibley, P.A.

(57) ABSTRACT

Robotic systems and methods are provided for tending, manipulating, engaging, acting upon, observing and/or monitoring objects and conditions in a defined volume or space ("work space") in or overlying a target area. The robotic system includes a mobile robot supported by or suspended from suspension cables secured to spaced apart anchor locations.

19 Claims, 6 Drawing Sheets

(56) References Cited

U.S. PATENT DOCUMENTS

| | | | | |
|---|---|---|---|---|
| 4,873,644 A * | 10/1989 | Fujii | | A01D 46/24 56/10.2 R |
| 4,904,996 A * | 2/1990 | Fernandes | | G01R 15/142 340/601 |
| 4,975,016 A * | 12/1990 | Pellenc | | A01D 46/24 294/185 |
| 5,499,306 A * | 3/1996 | Sasaki | | B25J 9/1697 382/153 |
| 5,523,663 A * | 6/1996 | Tsuge et al. | | 318/568.16 |
| 6,009,186 A * | 12/1999 | Gorretta | | G01N 21/94 209/577 |
| 6,566,834 B1 | 5/2003 | Albus et al. | | |
| 6,873,355 B1 * | 3/2005 | Thompson et al. | | 348/144 |
| 6,975,089 B2 * | 12/2005 | Rodnunsky | | B66C 13/08 104/180 |
| 7,088,071 B2 * | 8/2006 | Rodnunsky | | 318/649 |
| 7,597,162 B2 * | 10/2009 | Won | | B25J 5/005 180/8.2 |
| 7,854,108 B2 * | 12/2010 | Koselka et al. | | 56/10.2 A |
| 8,199,197 B2 * | 6/2012 | Bennett | | F16M 11/105 348/144 |
| 8,387,221 B2 * | 3/2013 | Kerschner et al. | | 29/33 R |
| 8,909,379 B2 * | 12/2014 | Fisher | | B66C 21/00 472/80 |
| 9,063,390 B2 * | 6/2015 | Wharton | | |
| 2003/0070409 A1 * | 4/2003 | Adams | | A01D 46/005 56/328.1 |
| 2003/0182259 A1 * | 9/2003 | Pickett | | A01B 79/005 |
| 2004/0122592 A1 * | 6/2004 | Fuessley | | A01G 7/06 702/2 |
| 2005/0034441 A1 * | 2/2005 | Porta | | A01D 46/264 56/328.1 |
| 2005/0126144 A1 * | 6/2005 | Koselka | | A01D 46/30 56/10.2 R |
| 2005/0224438 A1 * | 10/2005 | Maurer et al. | | 212/274 |
| 2006/0120601 A1 * | 6/2006 | Dietsch | | G06K 9/00664 382/173 |
| 2006/0150602 A1 * | 7/2006 | Stimmann | | A01D 46/30 56/10.5 |
| 2006/0213167 A1 * | 9/2006 | Koselka | | A01D 46/30 56/10.2 A |
| 2007/0075048 A1 * | 4/2007 | Kunisaki | | B23K 11/253 219/91.1 |
| 2008/0010961 A1 * | 1/2008 | Gray | | A01D 46/30 56/10.2 A |
| 2009/0066100 A1 * | 3/2009 | Bosscher | | B25J 17/0266 294/86.4 |
| 2010/0315422 A1 * | 12/2010 | Andre et al. | | 345/426 |
| 2011/0022231 A1 * | 1/2011 | Walker | | A01D 46/264 700/259 |
| 2012/0176218 A1 * | 7/2012 | Ahn | | G08B 13/19656 340/5.54 |
| 2014/0311014 A1 * | 10/2014 | Feugier | | A01M 1/226 43/107 |

OTHER PUBLICATIONS

"Welcome to Garduino," Garduino, Retrieved Date: May 16, 2012, From URL:http://garduino.dirtnail.com/home.html (36 pages).

"Inside the Greatest Show on TV," Cablecam, Retrieved Date: May 16, 2012, From URL:http://www.cablecam.com/uploadedImages/Home/News/Mens%20Journal%20Article%20full%20size.jpg?n=6215 (1 page).

"Camera's Cradle," Dalina Law, Retrieved Date: May 16, 2012, From URL:http://www.dalinalaw.com/images/big_nyt_graphic.jpg (1 page).

"RoboCrane," The National Institute of Standards and Technology, Retrieved Date: May 16, 2012, From URL:http://www.nist.gov/el/isd/robocrane2.cfm (1 page).

Agrobot, Retrieved Date: May 16, 2012, From URL:http://www.agrobot.com/ (2 pages).

Bostelman et al., "Cable-Based Reconfigurable Machines for Large Scale Manufacturing," International Conference on New Technological Innovation for the 21$^{st}$ Century, Jul. 23-26, 2000 (6 pages).

Grow Control, Retrieved Date: May 16, 2012, From URL:http://growcontrol.com (9 pages).

"Growmanager—The Open Source Greenhouse Control System," Growmanager, Retrieved Date: May 16, 2012, From URL:http://www.growmanager.de/index.php (3 pages).

"Precision Agriculture: Sustainable Farming in the Age of Robotics," CSAIL, Retrieved Date: May 16, 2012, From URL:http://www.csail.mit.edu/csailspotlights/feature2 (2 pages).

* cited by examiner

SUSPENDED ROBOT SYSTEMS AND METHODS FOR USING SAME

RELATED APPLICATION(S)

This application claims the benefit of and priority from U.S. Provisional Patent Application No. 61/662,178, filed Jun. 20, 2012, the disclosure of which is incorporated herein by reference in its entirety.

FIELD OF THE INVENTION

The present invention is related to robots.

BACKGROUND

Gardens are often created and maintained for a number of reasons. For example, many consumers desire the freshest ingredients and/or food that has not been exposed to pesticides or herbicides. However, maintenance of such gardens may be dull and laborious.

SUMMARY

Embodiments of the present invention are directed to robotic systems and methods for tending, manipulating, engaging, acting upon, observing and/or monitoring objects and conditions in a defined volume or space ("work space") in or overlying a target area. The robotic system includes a mobile robot supported by or suspended from suspension cables secured to spaced apart anchor locations.

According to embodiments of the present invention, a robot system includes at least one suspension cable, an autonomous mobile robot suspended by the at least one suspension cable in a work space, and a controller. The robot system is operative to selectively move the suspended mobile robot about the work space. The mobile robot includes a camera to acquire image data from the work space. The controller is configured to use the image data from the camera to automatically determine a position of the mobile robot within the work space.

In some embodiments, the mobile robot further includes an implement movable with the camera, and the controller is configured to move the implement about the work space as a function of the image data acquired by the camera. According to some embodiments, the controller is configured to reposition the implement within the work space in at least two dimensions as a function of the image data acquired by the camera. The controller may be configured to reposition the implement within the work space in three dimensions as a function of the image data acquired by the camera. In some embodiments, the implement includes at least one of a tool and a sensor. In some embodiments, the implement includes a mechanical tool.

According to some embodiments, the controller is configured to correlate the image data from the camera with the position of the camera in the work space to generate a map of the image data with respect to the work space. The controller may be configured to generate a three-dimensional map of the image data with respect to the work space.

In some embodiments, the mobile robot further includes a sensor to acquire sensor data from the work space, and the controller is configured to correlate the sensor data from the sensor with the position of the sensor in the work space to generate a map of the sensor data with respect to the work space.

According to some embodiments, the robot system includes at least one encoder operative to generate tracking signals corresponding to movement of the mobile robot relative to the at least one suspension cable. The controller is configured to use the tracking signals from the at least one encoder to determine a coarse position of the mobile robot in the work space, and to correct the coarse position using image data from the camera acquired from the work space.

According to embodiments of the present invention, a robot system includes at least one suspension cable, an autonomous mobile robot suspended by the at least one suspension cable in a work space, and a controller. The robot system is operative to selectively move the suspended mobile robot about the work space. The mobile robot includes: a camera to acquire image data from the work space; and an implement movable with the camera. The controller is configured to move the implement about the work space as a function of the image data acquired by the camera.

In some embodiments, the controller is configured to reposition the implement within the work space in at least two dimensions as a function of the image data acquired by the camera.

In some embodiments, the controller is configured to reposition the implement within the work space in three dimensions as a function of the image data acquired by the camera.

In some embodiments, the implement includes at least one of a tool and a sensor. The implement may include a mechanical tool.

According to embodiments of the present invention, a robot system includes at least one suspension cable, an autonomous mobile robot suspended by the at least one suspension cable in a work space, and a controller. The robot system is operative to selectively move the suspended mobile robot about the work space. The mobile robot includes a sensor to acquire sensor data from the work space. The controller is configured to correlate the sensor data from the sensor with the position of the sensor in the work space to generate a map of the sensor data with respect to the work space.

In some embodiments, the controller is configured to generate a three-dimensional map of the sensor data with respect to the work space.

According to embodiments of the present invention, a robot system includes a rectangular work plot located in/on a residential property, and a robot system. The robot system includes a mobile robot suspended over the work plot in a work space. The mobile robot includes a camera to acquire images from the work space. The robot system is operative to selectively move the suspended mobile robot about the work space.

According to embodiments of the present invention, a robotic work system includes a designated work plot having first and second designated corner locations, a first functional station disposed in the first designated corner location, a second functional station disposed in the second designated corner location, and a robot system. The robot system includes at least one suspension cable, and a mobile robot suspended by the at least one suspension cable over the work plot in a work space. The robot system is operative to selectively move the suspended mobile robot about the work space and to each of the first and second functional stations.

According to some embodiments, the first functional station includes a tool station holding a tool, and the mobile robot is operable to engage the tool, carry and use the tool in the work space, and thereafter return the tool to the tool station.

According to embodiments of the present invention, a robot system for use with a work plot includes a support, at least one suspension cable having first and second end portions, the first end portion being attached to the support, and a mobile robot suspended from the support by the at least one suspension cable over the work plot in a work space. The mobile robot includes: a robot body carried by the at least one suspension cable; a spool mounted on the robot body, wherein the second portion of the suspension cable is wound about the spool; and a spool motor mounted on the robot body to selectively rotate the spool. The robot system is operable to selectively move the suspended mobile robot about the work space by driving the spool using the spool motor.

According to embodiments of the present invention, a robot system includes a support adjacent a work space, at least one suspension cable having first and second end portions, the first end portion being attached to the support, a mobile robot suspended from the support by the at least one suspension cable in a work space, a spool having the second portion of the suspension cable wound about the spool, a spool motor configured to selectively rotate the spool to wind the suspension cable onto the spool, and a spool motor drive circuit. The spool motor drive circuit is operative to selectively control the spool motor to rotate the spool in a first spool direction to wind the suspension cable onto the spool to move the mobile robot through the work space in a first direction against the force of gravity, and to permit the spool to rotate in a second spool direction counter to the first spool direction to permit the mobile robot to move through the work space in a second direction assisted by gravity.

According to some embodiments, the spool motor drive circuit includes a half H-bridge motor drive circuit.

In some embodiments, the robot system includes: four supports positioned around a rectangular work plot; four suspension cables each having first and second end portions, each of the first end portions being attached to a respective one of the supports, wherein the mobile robot is suspended from the four supports by the four suspension cables; four spools each having the second portion of a respective one of the suspension cables wound about the spool; four spool motors each configured to selectively rotate a respective one of the spools to wind the associated suspension cable onto the spool; and four spool motor drive circuits each operative to selectively control a respective one of the spool motors to rotate the associated spool in a first spool direction to wind the associated suspension cable onto the spool to move the mobile robot through the work space in a first direction against the force of gravity, and to permit the spool to rotate in a second spool direction counter to the first spool direction to permit the mobile robot to move through the work space in a second direction assisted by gravity.

According to embodiments of the present invention, a robot system includes at least one suspension cable, a mobile robot suspended by the at least one suspension cable in a work space, at least one encoder, and a controller. The mobile robot includes a camera to acquire images from the work space. The at least one encoder is operative to generate tracking signals corresponding to movement of the mobile robot relative to the at least one suspension cable. The controller is configured to use the tracking signals from the at least one encoder to determine a coarse position of the mobile robot in the work space, and to correct the coarse position using images from the camera acquired from the work space.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 3 (FIGS. 3A and 3B, collectively) is a schematic diagram representing an electronics system of the robotic gardening system of FIG. 1.

DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The term "automatically" means that the operation is substantially, and may be entirely carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

As used herein, "operator" or "user" refers to a person in possession of or who exercises control over the robotic system, mobile robot, or garden. The operator or user may typically be the owner of the robotic system, mobile robot, or garden, but in some instances may be a representative or agent of the owner (e.g., a caretaker). Thus, in all cases where an "operator" or "user" is referred to herein, it will be understood that in accordance with some embodiments, the user or operator is the owner.

As used herein, "organic garden" means a garden wherein plants are produced without using synthetic fertilizers, pesticides, or fungicides.

According to some embodiments, the robotic system is configured as a garden tending robotic system operative to tend, act upon and monitor a defined garden plot. The robot may take care of one or more hard parts of organic gardening, including (but not limited to) one or more of: weeding, pest control, watering (e.g., maintaining the level of moisture in a prescribed range), harvesting, notifying the user (e.g., the owner) when/what is ready for harvest (in some embodiments, by automatically sending the user a text (e.g. SMS) message or an email message), trimming and composting dead plant material (such as unharvested produce), planning, detecting and analyzing soil conditions, and planting.

In some embodiments, the robotic system includes a relatively small robotic device that is installed over a designated garden plot (e.g., a gardening box that the user may build). The robot may be solar powered. The robot may connect to the user's wireless network (e.g., a home WiFi network) or other RF network bridged to the Internet for email/text message notification, telemetry, application software ("app") purchases, updates, and/or remote operation, for example. In some embodiments, the user can check the status of the garden and/or the robot and view the garden via a Web browser (accessing a web page) that ties through a web portal, client or mobile app. This web portal also may provide access to software updates and an application store, where new features or capabilities can be purchased, such as an expanded repertoire of plant types that the robotic system can tend (e.g., data sets defining procedures for tending a plant type). In some embodiments, the user is provided with access (e.g., in accordance with a subscription agreement) to cloud computing services through an Internet portal.

In some embodiments, the robot user or operator can operate the robot in stand-alone mode, without access to the Internet and without paying a subscription fee. In this case, the operator may not have access to tele-operation, an application store, software updates, and other web features.

Weed recognition may rely upon onboard local processing or cloud computing-based vision processing, thus necessitating access to a weed image database (e.g., through a subscription).

The garden tending robotic system may be scaled for small (i.e., having an area in the range of from about 12 ft$^2$ (e.g., 3 ft×4 ft) to 400 ft$^2$ (e.g., 20 ft×20 ft) home gardens. The robotic system can be particularly well-suited and advantageous for tending organic gardens. The robotic system can respond to common pest problems before they become serious by taking direct countermeasures and/or notifying the user (e.g., via email/SMS alert) in the event human intervention may be required.

According to some embodiments, the gardening robot is supported by the suspension cables in such a manner that during all, most or at least certain of its activities, the robot does not contact the ground. The gardening robotic system can be scalable over different size plots (e.g., an eight by four foot area). The robotic system may permit relatively low cost packaging, storage and shipping. The robotic system may be configured to permit relatively simple (consumer level) do-it-yourself (DIY) deployment.

With reference FIGS. 1-5, a garden 5 (FIG. 1) including a robotic work or gardening system 10 according to embodiments of the invention is shown therein. The garden 5 includes a growing bed assembly 30, a robot system 100, a water supply station 40, a waste/compost receptacle station 42, a harvest receptacle station 44, and an implement or tool station 46. The growing bed assembly 30 defines a designated garden area or work plot G having a work space W thereabove. As described in more detail below, the robot system 100 includes a mobile robot 120 suspended by cables 112A-D in the work space W and operable to move about the work space W to tend a garden (e.g., plants and soil) in the bed assembly 30.

Figure 1:
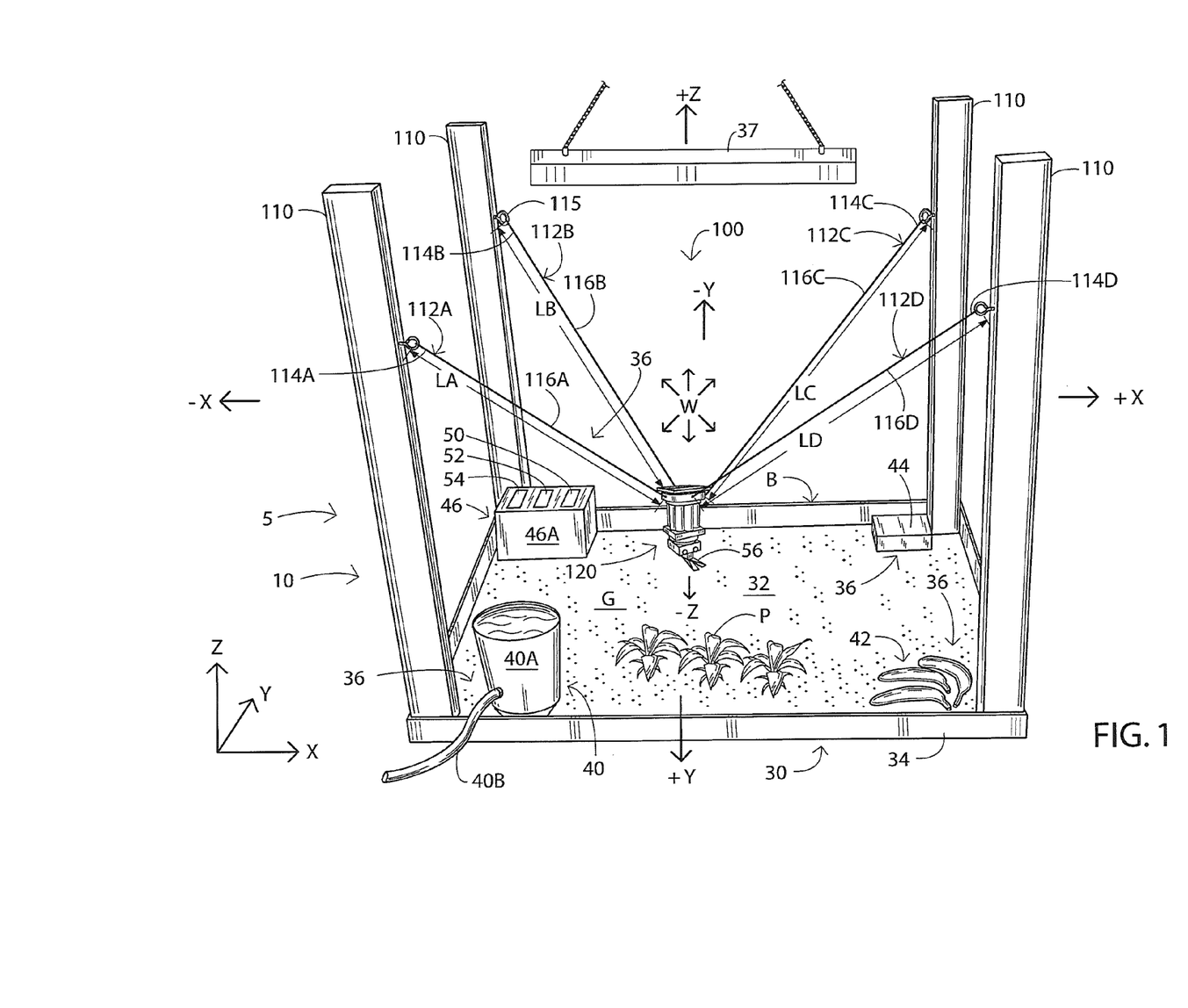
FIG. 1 is a perspective view of a garden including a robotic gardening system according to embodiments of the present invention.

The growing bed assembly 30 is exemplary and may be otherwise configured. The bed assembly 30 includes a surrounding wall or containment structure 34 and a mass of growing medium or soil 32 (e.g., potting soil) contained in the structure 34. The garden plot G, which includes some or all of the growing medium 32, is located in the structure 34 and is defined by as a garden boundary B (which, in the illustrated embodiment, is defined by the containment structure 34. Plants P to be grown and harvested are located in the growing medium 32. The growing bed assembly 30 may be assembled by the user or provided as part of a kit along with the robot system 100. For example, the assembly 30 could include a 4 foot×8 foot sheet of plywood as a base with four four foot high, 2 inch×4 inch studs as corner posts, and four 2 inch×8 inch planks forming a perimeter. The bed assembly 30 has a plurality of perimeter locations or corners 36 spaced about the perimeter of the boundary B.

While a raised bed is shown and described, the gardening plot may be otherwise constructed. For example, the gardening plot may instead be a designated section from a larger area of soil or other growing media. By way of further example, the gardening plot may include a plurality of containers containing growing media and positioned in the designated garden boundary.

The growing bed assembly 30 may be located indoors or outdoors. The growing bed assembly 30 may be exposed to sunlight (typically, direct sunlight) and/or may be provided with an artificial light source (e.g., a grow light 37). The growing bed assembly 30 may be enclosed in a greenhouse. According to some embodiments, the garden plot G is located in a residential structure or on the grounds of a residence.

According to some embodiments, the garden plot G is substantially rectangular. In some embodiments, the garden plot G has an area in the range of from about 12 ft$^2$ to 400 ft$^2$ and, in some embodiments, from about 32 ft$^2$ to 128 ft$^2$.

The water supply station 40 (FIG. 1) includes a container or cistern 40A positioned in a corner 36. The cistern 40A may be fluidly connected to a water supply (e.g., a pressurized water supply) via a conduit 40B with an automatic valve (e.g., a float valve) to provide a continuous water supply. Alternatively, the cistern 40A may be refilled periodically by the user.

The waste/compost receptacle station 42 (FIG. 1) is located in another corner 36. The waste/compost receptacle station 42 may include a designated corner surface portion, a bin, or a platform, for example, configured to collect and compost biodegradable matter such as plant trimmings.

The harvest receptacle station 44 (FIG. 1) is located in another corner 36. The harvest receptacle station 44 may include a designated corner surface portion, a bin, or a platform, for example, to receive plants and plant parts harvested from the plants P.

The implement or tool station 46 (FIG. 1) is located in another corner 36. As discussed below, the tool station 46 can be configured to store, present and receive one or more implements or tools (e.g., tools 50, 52, 54, 56) that can be used by the robot 120 to tend the garden. The tool station 46 may include a suitably configured rack 46A, for example.

The robot system 100 (FIG. 1) includes the robot 120, a plurality of supports 110, and the suspension cables 112A-D. The supports 110 are spaced about the perimeter of the bed assembly 30. Ends 114A-D of the cables 112A-D are secured to respective ones of the supports 110 (e.g., by eyebolts 115, for example).

Figure 2:
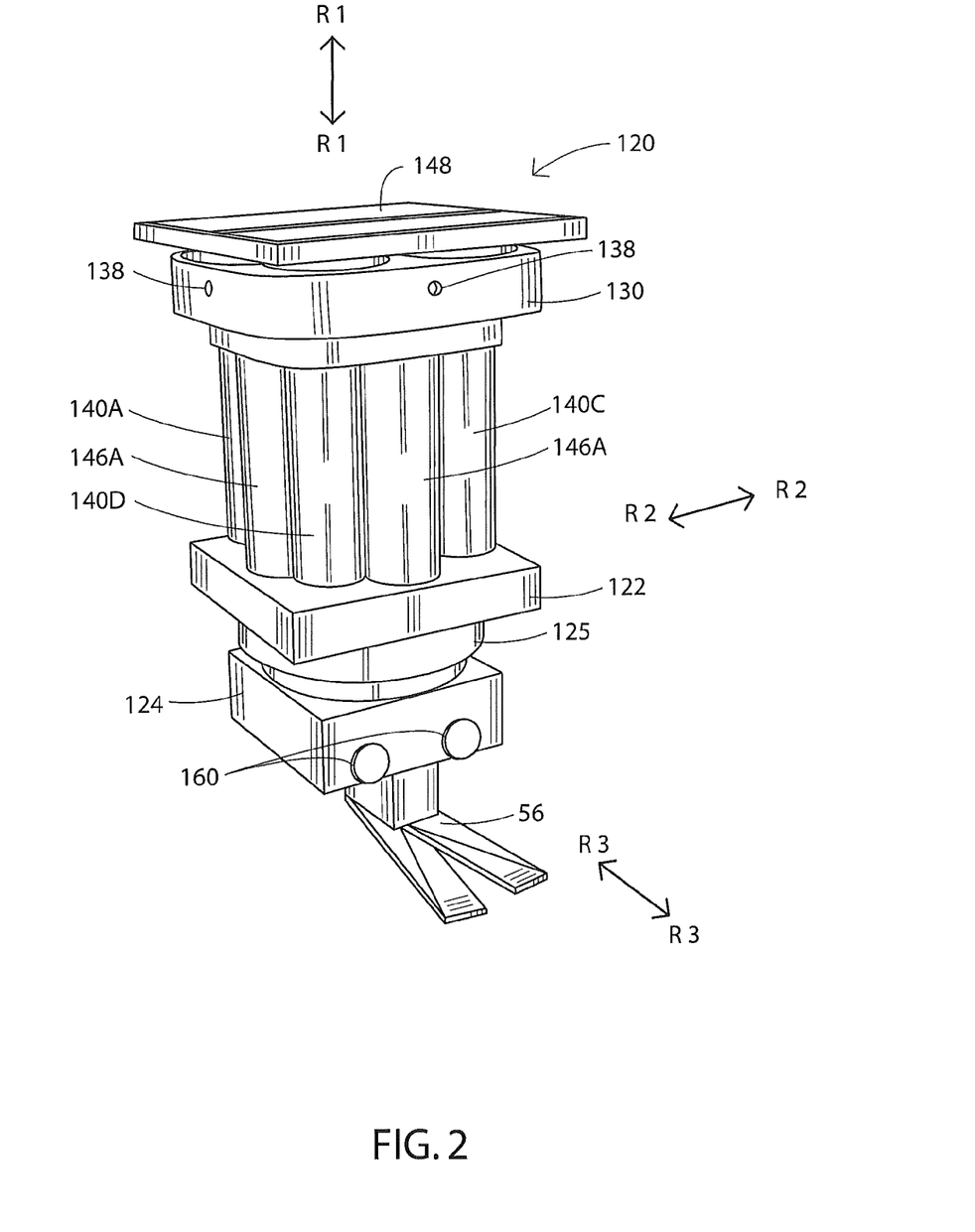
FIG. 2 is a perspective view of a robot forming a part of the robotic gardening system of FIG. 1.
Figure 3A:
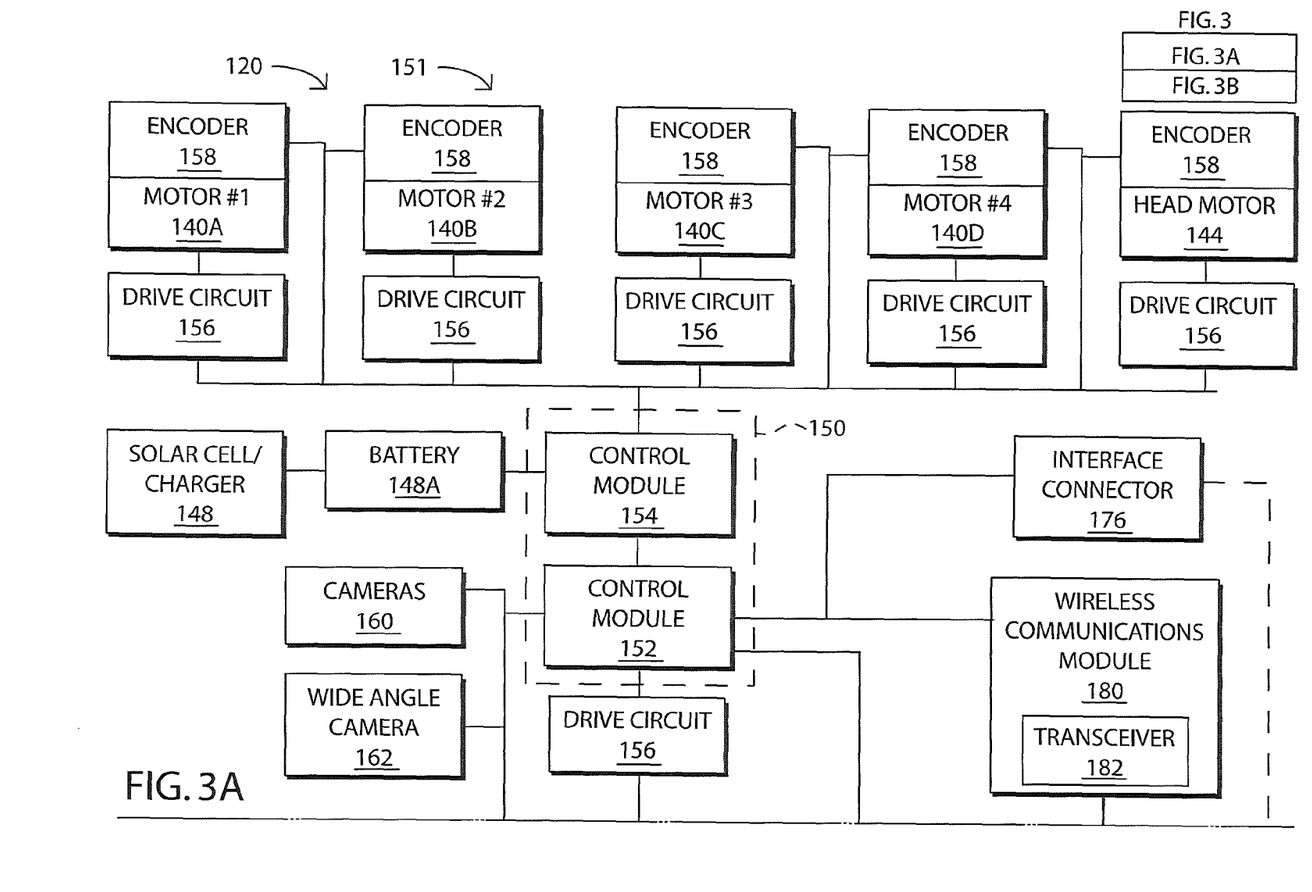
Figure 3B:
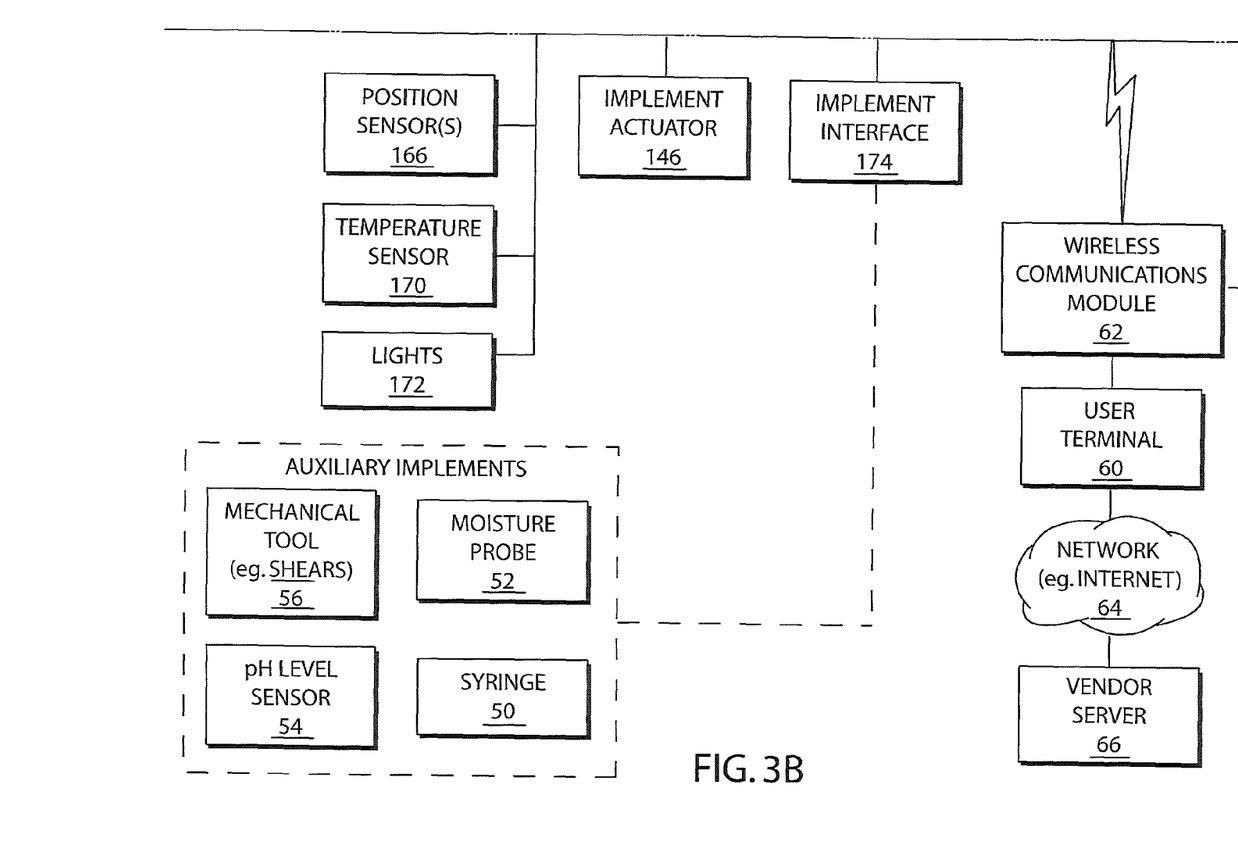
Figure 4:
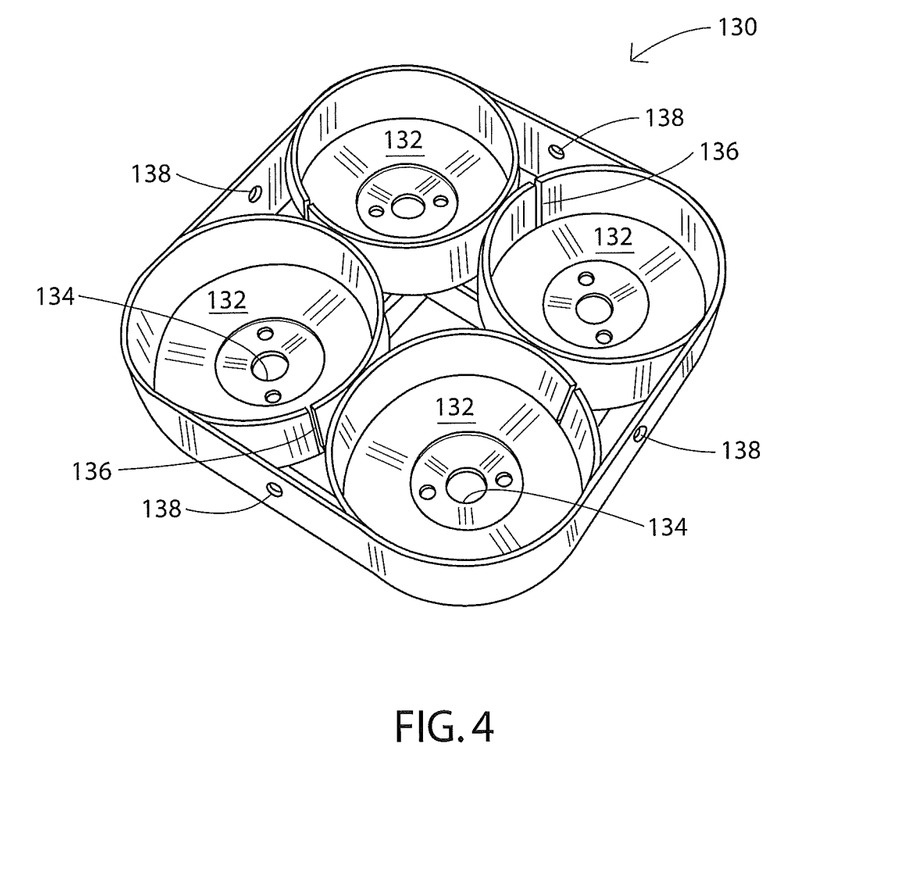
FIG. 4 is a perspective view of a spool housing forming a part of the robot of FIG. 3.
Figure 5:
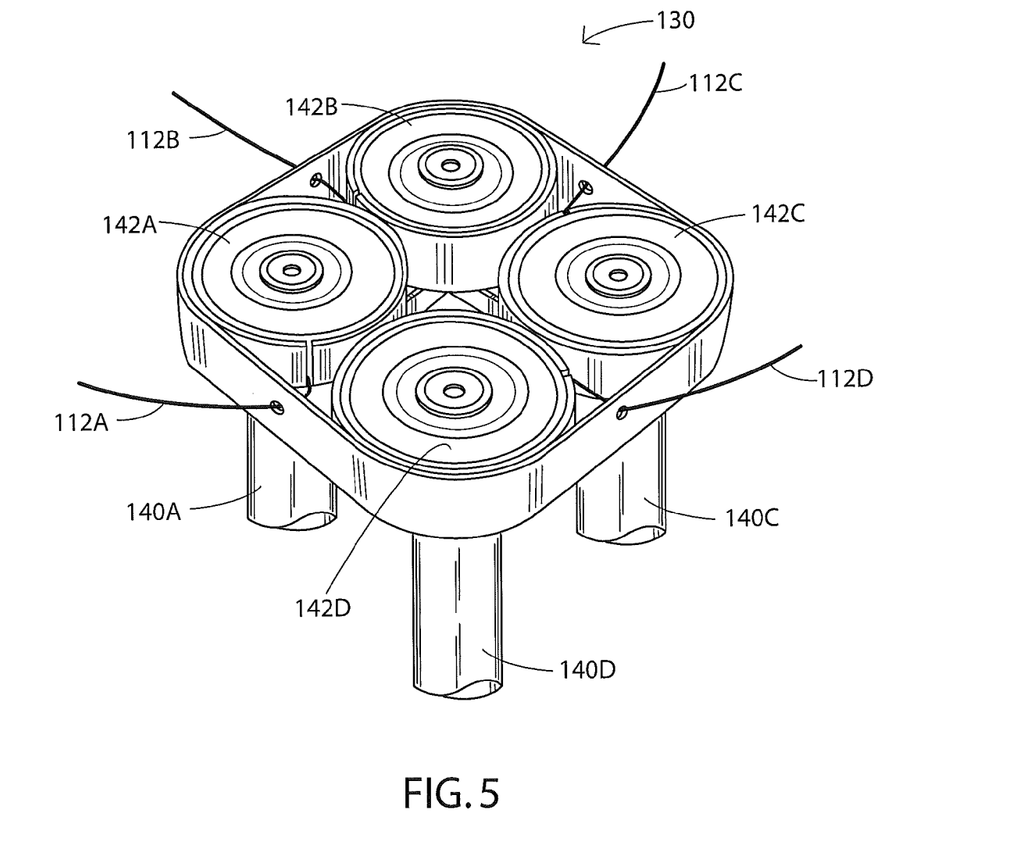
FIG. 5 is a fragmentary, perspective view of the robot of FIG. 3.

The robot 120 (FIGS. 2-5) includes a frame or body 122, a head 124, a spool subframe or housing 130, four spool motors 140A-D, four cable take-up spools 142A-D, a head motor 144, an implement actuator 146, a solar cell or panel 148, batteries 148A, and an electronics system 151. The head 124 is joined to the body 122 by a rotary joint 125 and the head motor 144 is operable to rotate the head 124 about a rotary or yaw axis R1-R1 (FIG. 3). That is, the joint 125 provides the head 124 with a yaw rotational degree of freedom allowing the head 124 to be aimed in any direction in the horizontal plane. The spool housing 130 is coupled to the body 122 by the motors 140A-D and the batteries 148A. According to some embodiments, the robot 120 has a volume in the range of from about 50 in$^3$ to 250 in$^3$.

The spool housing 130 (FIGS. 4 and 5) has four spool cavities 132 defined therein, each having an associated motor shaft hole 134, a cable slit 136, and a cable eyelet or exit port 138. Each of the spools 142A-D is mounted in a respective one of the cavities 132 and on a drive shaft of a respective spool motor 140A-D to be rotatively driven thereby in the cavity 132. A respective one of the cables 112A-D is partially wound onto each spool 142A-D such that the cable extends from the spool, out through the corresponding slit 136, and out through the corresponding exit port 138. Each cable 112A-D further includes an extended cable segment 116A-D (FIG. 1) extending from the exit port 138 to its cable end 114A-D at the associated support 110. As discussed below, the lengths LA, LB, LC, LD of the spanning or extended cable segments 116A-D will vary as the robot 120 is moved about. While four spools 142A-D are shown and described, more or fewer spools may be provided in other embodiments. The exit ports 138 may be provided with bushings or grommets (e.g., formed of smooth brass) to reduce wear on the spool housing 130 and the cables 112A-D.

The motors 140A-D, 144 may be any suitable type(s) of electric motor. According to some embodiments, the motors 140A-D are electric motors capable of being back driven without damage and which draw a current proportional to the load on the motor. According to some embodiments, the motors 140A-D, 144 are brushed DC motors. In some embodiments, the motors 140A-D, 144 are brushless DC motors.

With reference to FIG. 3, the electronics system 151 includes a controller 150. The controller 150 includes a lower control module 152 below the joint 125 and an upper control module 154 above the joint 125. By utilizing two separate control modules above and below the joint 125, the number of wires that must cross the joint 125 can be reduced. However, the control architecture of the robot 120 may be otherwise arranged or configured. For example, the functionality of the control modules 152, 154 may be combined into a single controller or may be distributed across three or more controllers.

The controller 150 may be any suitable device(s) for providing the functionality described herein. Embodiments of the controller 150 logic may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, controller 150 logic may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices. According to some embodiments, the controllers are appropriately configured microprocessor-based circuit boards.

To aid with portability and simplicity of installation, the robot 120 can be solar powered. The solar panel 148 located above the spool mechanisms is used to charge the onboard battery system. Because the expected operational duty cycle of the system is expected to be relatively small (typically 10-20 minutes/day) the solar panel 148 does not need to be very large. Charge control for the batteries 148A is managed by the power control board or control module 152, which also contains the motor control electronics. The solar panel 148 and the batteries 148A may be of any suitable type and size. In some embodiments, the batteries 148A include four 18650 Lithium Ion (Li-Ion) battery cells arranged in a 2S2P configuration (two cells in series and two in parallel). The solar panel 148 may be relatively small with an overall surface area of between about 4 in$^2$ and 25 in$^2$.

The control module 154 controls the motors 140A-D, 144 via respective drive circuits 156 and can track rotation of the motors 140A-D, 144 via respective motion encoders 158 (e.g., rotary encoders). The control module 154 may also control power management.

The exemplary electronics system 151 further includes stereoscopic cameras 160, a wide angle camera 162, one or more position sensors 166, a temperature sensor 170, a lighting system 172, an implement interface 174, an interface connector 176 (e.g., a USB connector), and a communications module 180 in the head 124. The communications module 180 may be a wireless communications module including a wireless transceiver 182. The implement actuator 146 can be mounted in the head 124 and may include an electric motor controlled by the control module 154 via a drive circuit 156.

The lighting system 172 includes one or more lamps and/or LEDs. According to some embodiments, the lighting system 172 includes a multi-spectral lighting system. In some embodiments, the lighting system 172 is operable to emit radiation in only selected spectrums.

As discussed above, the robot system 100 may include one or more auxiliary implements or tools configured to be mated to and carried by the robot 120 to execute actions in the work space W. The implement interface 174 is intended to allow one or more such tools or devices to be attached at the bottom of the head 124. The tools will typically operate off to the side of the head 124 from the bottom or at an angle, and not directly downwards. The implement interface 174 may provide both mechanical coupling and electrical connection between the robot 120 and the tools. The tools may include (but are not limited to) one or more of: a dispenser tool 50, a probe tool (e.g., a moisture probe tool 52, or a pH level sensor tool 54), and a mechanical tool 56. The dispenser tool 50 may include a syringe, for example, that can be operated to draw a selected liquid (e.g., water from the cistern 40) and discharge the liquid on command. The mechanical tool 56 may be a shearing tool having scissor blades, for example.

In some embodiments, a motive force is applied to the auxiliary tool as needed (e.g., to drive the shears 56 or the syringe 50). In some embodiments, motive force is provided to the tool by the robot 120 using the implement actuator 146 (i.e., the tool is actuated mechanically through the interface 174). In some embodiments, the tool itself includes motors, actuators, sensors and/or processing elements as needed to execute the desired functions. The interface 174 can provide an electronic connection between the tool and the robot 120 to control the operation of the tool and/or exchange communications or data signals. For example, a sensor tool may include a probe configured to make direct contact with the growing medium (e.g., soil) or a plant, in which case some or all of the detection and processing electronics may be disposed in the tool.

While certain devices have been described hereinabove as being embodied in a mateable and releasable tool, some or all of these devices may instead be embodied in the robot 120. For example, a moisture probe, pH level sensor, or mechanical tool (e.g., shears) may be integrated into the robot 120. Similarly, while certain devices have been described hereinabove as being integrated into the robot 120, some of these devices may instead be embodied in a mateable and releasable tool. For example, the light emitting devices and/or one or more cameras may be provided in an auxiliary tool.

The robot system 100 can further include a user terminal 60 having a wireless communications module 62 capable of wirelessly communicating with the robot 120 via the wireless communications module 182. The wireless communications module 62 may be a conventional WiFi wireless access point, for example. The user terminal 60 may be a personal computer or router connected to a network 64 (in some embodiments, the Internet). The user terminal 60 may be connected to a remote server 66 via the network 64 to enable relay of communication signals between the robot 120 and the remote server 66. In some embodiments, the remote server 66 is a server under the control of an outside entity (i.e., independent of the owner of the garden plot G). In some embodiments, the remote server 66 is a vendor server owned and operated by a vendor to provide services and goods to the user online. For example, the vendor server 66 may be operated by the seller of the robot system 100.

The garden 5 can be constructed and operated as follows in accordance with embodiments of the present invention. It will be appreciated that certain of the operations, steps, features, components, and the like are optional or can be configured or combined in ways other than those described below.

The bed assembly 30 is constructed and the supports 110 are installed about the garden plot G. The cable ends 114A-D are attached to the supports 110 such that the robot 120 is suspended above the garden plot G in the workspace W.

The software or firmware of the robot 120 may be configured or updated using the interface connector 176 or the wireless communications module 180. The user may, for example, input new settings directly or from the remote (e.g., vendor) server 66. For example, the interface connector 176 (e.g., USB port) may be used to initially configure the wireless communications module 180 to the user's local WiFi system, and thereafter the robot 120 may be connected to the user terminal 60 (e.g., via a local area network) or the remote server 66 for further configuration or programming. The interface connector 174 may also be used for firmware updates or to download diagnostic data (e.g., from a damaged robot 120). Configuration may be executed using a Web browser interface at the user terminal 60.

The robot 120 can be moved about the work space W by differentially adjusting (shortening and lengthening) the lengths LA, LB, LC, LD (FIG. 1) of the extended cable segments 116A-D. More particularly, each of the spool motors 140A-D is independently operated to take up or wind the corresponding cable 112A-D onto the associated spool 142A-D and to pay out, release or unwind the cable 112A-D from the spool 142A-D through the corresponding exit port 138. The controller 150 coordinates the actuation of the motors 140A-D as needed to achieve the desired movement and end positioning of the robot 120.

By way of example, the robot 120 can be translated along the horizontal X axis in one desired direction +X by paying out the cables 112A, 112B while taking up the cables 112C, 112D on the opposite side of the robot 120. Alternatively, the robot 120 can be translated along the horizontal X axis (i.e., left and right) in the opposite direction −X by paying out the cables 112C, 112D while taking up the cables 112A, 112B. Similarly, the robot 120 can be translated along the horizontal Y axis (i.e., front and back) in one desired direction +Y by paying out the cables 112B, 112C while taking up the cables 112A, 112D. Alternatively, the robot 120 can be translated along the horizontal Y axis in the opposite direction −Y by paying out the cables 112A, 112D while taking up the cables 112B, 112C. The robot 120 can be translated along the vertical Z axis (i.e., up and down) by reducing and increasing the collective or combined lengths LA, LB, LC, LD of the extended cable segments 116A-D. Thus, for any given combination of extended cable segment lengths LA, LB, LC, LD, the robot 120 will assume a corresponding position in the work space W.

In some embodiments, the controller 150 coordinates the actuation of the motors 140A-D to selectively tilt or rotate the robot 120 about one or more rotational axes R1-R1, R2-R2, R3-R3 (e.g., yaw, roll, pitch; FIG. 2). By controlling the orientation of the robot 120, the controller 150 can better position the robot 120 for some actions (e.g., can position the shear tool 56 at a better angle to reach underneath foliage or other obstacles).

Accordingly, the robot 120 can be moved with six degrees of freedom (DOF) by selective, independent and coordinated actuation of the motors 140A-D to adjust the cable lengths LA, LB, LC, LD. The head motor 144 can rotate the head 124 relative to the body 122 about the joint 125 (i.e., axis R1-R1) to provide an additional degree of freedom. Further degrees of freedom may be provided by one or more auxiliary tools mated to the robot 120. However, in other embodiments, the robot system and robot may be configured to provide a greater or lesser number of degrees of freedom. For example, the robot system may be provided with only two suspension cables or the cables may be paired to only operate in tandem so that the robot can only be translated in along one horizontal axis and the vertical axis.

According to some embodiments, the spool motors 140A-D are electrical motors configured such that the output torque from the motor is proportional to the current applied to the motor (e.g., a brushed DC electric motor). In this case, the cable segment lengths LA, LB, LC, LD are adjusted by adjusting the electrical current applied to the corresponding motor 140A-D to increase or decrease the output torque from the motor and thereby the tension on the cable segment 116A-D. To retract a cable segment onto its spool, the cable tension is increased by increasing the electrical current to the motor. To dispense a cable to increase the length of its extended cable segment, the current applied to the motor is reduced or reversed to drive the motor in the unspooling direction.

Generally, the weight of the robot 120 will draw or assist in drawing the cable from the spool. According to some embodiments, the weight of the robot 120 is sufficient to backdrive the motors, and the drive circuits 156 of the spool motors 140A-D are half H-bridge motor drive circuits configured to drive each motor 140A-D in its take up direction. In other embodiments, full H-bridge drive circuits are used for the drive circuits 156 of the spool motors 140A-D to also provide a drive current to the motor in the unspooling direction. For example, the unspooling current may be necessary or desirable in some embodiments to overcome gear inefficiency and system friction.

Thus, the robot 120 can move around the work space W by differentially drawing or releasing cable tension on the four spools 142A-D. For example, in some embodiments, to move upwards, cable tension can be increased by increasing the electrical current to the motors; to descend, the motor currents are reduced and the weight of the robot 120 will draw cables from the spools; and to move the robot 120 in the horizontal direction, tension in the cables is increased on the side of the direction of desired travel while tension is reduced on the opposite side.

Advantageously, the horizontal separation or distance between the cable exit ports 138 enhances the passive stability of the suspended robot 120. The passive stability of the robot 120 may also be enhanced by locating the cable exit ports 138 above the center of gravity of the robot 120.

Locating the drive assembly of the robot system 100 (i.e., the motors 140A-D, the spools 142A-D, and the power supply for the motors 140A-D) onboard the robot 120 can make the robot system 100 more end user friendly and reliable. With the exception of the supports 110 (which may be provided by the end user), the robot system 100 can be packaged relatively compactly. The robot system 100 can be easily installed or assembled in the work volume or space W by merely pulling the four cables 112A-D out and attaching their ends 114A-D to the supports 110 at elevated corner attachment points.

Movement and the positions of the cables 112A-D and of the robot 120 can be tracked or determined using any suitable technique(s). In some embodiments, the robot 120 is autonomous and a controller of the robot system (e.g., the on-board controller 150) automatically and programmatically determines a position of the robot 120 within the work space W using image data acquired from the work space W by one or more on-board cameras (including the cameras 160 and/or the camera 162, for example).

According to some embodiments, the length of each cable wound onto and unwound from its spool is determined by detecting rotation of the corresponding motor or spool via the encoder 158 (e.g., a quadrature encoder) associated with the motor. The tension of each cable can be approximated from the electrical current applied to the corresponding spool motor 140A-D, the applied current corresponding to the torque on the motor (some adjustments may be made to correct for stiction/friction and other uncertainties).

In some embodiments, the camera/vision system described below (including cameras 160 and/or camera 162, for example) is used to measure the angles of the cables as they depart from the cable exit portals.

The stereoscopic cameras 160 and/or the wide angle camera 162 can be used to enable the controller 150 to determine landmarks for navigation. For example, the cameras 160, 162 can be used to capture images of the four corner supports 110 to which the cables 112A-D are attached, and these images can be processed by the controller 150 to determine the position of the robot 120 in the work space W frame of reference. The stereoscopic cameras 160 can provide depth sensing both for assessing the locations of landmarks and for assessing the locations of the plants P, the growing medium 32, the corner stations 40, 42, 44, 46, or other objects in the work space W, for example.

In some embodiments, the controller 152 uses feedback of cable motion from the encoders 158 (of the spool motors 140A-D) to determine or approximate the position of the robot 120 in the work space W for directing coarse maneuvering, and uses image data from the cameras 160 to more precisely maneuver the robot 120 into position. The feedback from the encoders 158 may be used to reposition the robot 120 with reference to a map or reference point(s) in the work space W. For example, the controller 150 may use the encoder feedback to place the robot 120 in the vicinity of a target location or target (e.g., a plant P or corner stations 40, 42, 44, 46), then use an image or images captured by the cameras 160 to more precisely assess the actual or absolute position of the robot 120 relative to the target, and then further move the robot 120 to better position the robot to address the target (e.g., to trim the plant P or engage a tool at the station 46). By using encoder feedback for coarse maneuvering in combination with visual or image-based correction for precise maneuvering, the robot system 100 can automatically adjust, correct or recalibrate for changes in the work space W (e.g., reconfiguration, shift or displacement of a target) and the robot system 100 (e.g., stretching of the cables, sag in the supports, electronic drift, mechanical wear, etc.).

The position sensor(s) 166 may include an accelerometer, tilt sensor, inclinometer or other suitable device(s) that can be used to coordinate the cable tension/motion and keep the robot 120 upright or to tilt the robot 120 into a desired orientation. The position sensor(s) 166 may include a sonar sensor to determine the height of the robot 120 from garden plot G.

In use, the robot system 100 may execute one or more actions in the work space W using one or more devices carried thereon. These devices may be integral, onboard devices or may include devices incorporated in the tools 50, 52, 54, 56. In the exemplary embodiment, the robot 120 moves through the work space W between the corner stations 40, 42, 44, 46, and the plants P and growing medium 32 (or in the vicinity thereof) to execute various garden tending actions. These actions may be executed in any suitable sequence, periodically, in accordance with a schedule, and/or on command.

As will be appreciated from the description herein, in some embodiments, a controller of the robot system 10 (and in some embodiments, the on-board controller 150) moves the implement(s) about the work space W as a function of the image data acquired by the camera(s) (e.g., the cameras 160 and/or 162). In some embodiments, the controller is configured to automatically and programmatically reposition the implement(s) in at least two dimensions as a function of the image data acquired by the on-board camera(s) and, in some embodiments, in three dimensions.

In use, the robot system 100 can operate the robot 120 to move to the tool station 46, retrieve a selected tool 50, 52, 54, 56, move the robot 120 (carrying the tool) to a selected location in the work space W, and use the tool in the selected location. The robot system 100 can then operate the robot 120 to move to the tool station 46, return the tool 50, 52, 54, 56 to the tool station 46, and move the robot 120 away from the tool station 46. The tools 50, 52, 54, 56 may be used and re-used as needed.

In some operations, the robot system 100 operates the robot 120 to move to the water station 40, to draw water from the cistern 40A using the syringe 50, to then move to a desired location or locations in the work space W, and to dispense the water from the syringe 50 onto the growing medium 32. If required, the robot 120 may dispense the water in a nonuniform distribution on the growing medium 32 (e.g., if the moisture content of the soil is uneven or certain plants require more watering than others).

In some embodiments, the robot 120 is used to dispense other materials in the work space W. For example, the syringe 50 may be used to collect and dispense fertilizer or a pest repellant.

The robot 120 may analyze conditions of the growing medium 32. For example, the robot 120 may analyze the growing medium 32 to determine its moisture content level/humidity. The moisture content may be detected using the moisture probe tool 52). In some embodiments, the cameras 160 can be used to judge the humidity level of the growing medium 32. In some embodiments, the lighting system 172 is used to facilitate or enhance image capture for analysis by illuminating the imaged soil. If the determined moisture level is too low, the robot 120 can then retrieve and dispense water from the water station 40 as discussed above.

The robot 120 may retrieve and use the pH level sensor tool 54 to assess the pH level of the growing medium 32.

In some operations, the robot 120 collects harvest portions from the plants P, then carries the harvest portions to the harvest station 44, and deposits the harvest portions at the harvest station 44. A suitable tool or actuator for holding may be provided onboard the robot 120 or as an auxiliary tool 56.

In some operations, the robot 120 collects waste portions from the plants P, then carries the waste portions to the compost station 42, and deposits the waste portions at the compost station 42.

In some operations, the robot 120 identifies weeds (as discussed below), and reports the presence of the weeds and/or executes corrective action to kill, abate or eradicate the weeds. In some embodiments the robot 120 removes the weeds from the growing medium 32, then carries the weeds to a selected location such as the compost station 42, and deposits the weeds at the selected location.

In some operations, the robot 120 identifies pests (as discussed below) such as plant damaging insects, and reports the presence of the pests and/or executes corrective action to kill, abate or eradicate the pests.

According to some embodiments, the lighting system 172 is a multi-spectral lighting system operable to emit red, blue, green, and ultraviolet illumination in sufficient quantities for the cameras 160 to operate in the absence of ambient light. The colored lights can be combined to provide white light for tele-operations or taking pictures for relaying status. In some embodiments, the emitted colors are individually controlled to aid in weed/plant identification or the identification of infestations.

The robot 120 may be provided with ambient temperature sensors as well as directional non-contact temperature sensors for assessing the temperature in the work space W.

According to some embodiments, the robot 120 acquires data to identify the presence and, in some cases, types of plants, weeds or pests in order to determine an appropriate response or action to be taken. In some embodiments, the cameras 160 are used to capture images of regions of interest (e.g., the plants P or adjacent regions) and these images are analyzed. The analysis may include comparison of the captured image to a reference image or images. In some embodiments, the robot system performs weed or pest recognition using machine vision recognition. In some embodiments, the captured images are used to determine which portions of the plants should be harvested.

In some embodiments, a sensor (e.g., one or more of the sensors 160, 162, 166 and 170) on-board the robot 120 is used to acquire sensor data from the work space W and a controller forming a part of the robot system 10 (e.g., the controller 150) is configured to correlate the sensor data from the sensor with the position of the sensor in the work space W to generate a map of the sensor data with respect to or as a function of the work space W. In some embodiments, the controller is configured to generate a three-dimensional map of the sensor data with respect to the work space W. In some embodiments, the sensor is a camera (e.g., one or more of cameras 160, 162) and the sensor data is image data acquired from the work space W by the camera(s).

Various data and images collected by the robot 120 can be stored and/or relayed or reported to the user or others for review. For example, the robot 120 can capture and forward photographs of the plants to the user in response to a user request or automatically and programmatically. This data may be transmitted wirelessly to the terminal 60 and forwarded to another terminal such as the user's mobile wireless communications terminal (e.g., cellular telephone) or the remote (e.g., vendor) server 66. In some cases, the robot 120 may send a request to the user or others for assistance.

In some embodiments, the software/logic and data files used to identify weeds, pests, harvest portions and other conditions are stored and used for processing on a computer remote from the robot 120. The robot 120 collects and forwards the data to the remote computer, which processes the data and replies to the robot 120 with an identification or command. In some embodiments, the remote computer is the remote server 66, which may be a vendor server, and this processing is provided as a cloud computing service. Some or all software and data files used to identify weeds, pests, harvest portions and other conditions may also be stored and used for processing onboard the robot 120. Updates to this software and databases may be provided to the robot 120 via the network 64.

According to some embodiments, the user acquires a subscription to certain services from a vendor that may be provided over the network 64 from the vendor server 66. These services may include data processing as discussed above (e.g., weed recognition), tele-operation capability, an online software application store, software updates, and other web features. The subscription services may be provided via an Internet portal.

A Web-based online community may be provided for sharing user created gardening programs, downloadable plant specific growing instructions, or other software, data and comments. Access to the online community may be subscription based or open.

Alternatively, the robot 120 may be operated in a stand-alone mode, without access to the network 64 (e.g., the Internet) or without the subscription services.

According to some embodiments, the robot system 100 is operable in a fully automatic mode wherein some or all of the actions described herein are fully automatically and programmatically executed by the controller 150 without requiring intervention by the user (other than placing the robot system 100 in the automatic mode). According to some embodiments, the robot system 100 is operable in a semi-automatic mode wherein the robot 120 will programmatically execute a prescribed task protocol in responsive to instructions by the user to perform the task.

Robot systems according to embodiments of the invention can provide a number of advantages. Because the mobile robot 120 is moved in the work space W while suspended over the garden plot G and makes only selective contact with the growing medium 32 (e.g., when probing the soil to assess soil conditions), the robot system 100 can avoid challenges that may be faced by a ground travelling robot. For example, the mobility of the suspended robot 120 is not impeded by irregular or soft (e.g., muddy) soil. The capability of the robot 120 to ascend and descend over the plot G can enable the robot to avoid undesired contact with objects in the work space W such as plants, tools, etc. If the garden plot G is segregated by mechanical barriers (e.g., a plurality of discrete pots or containers), the robot 120 can easily traverse the barriers by ascending and going over the barriers. Because the robot 120 makes only limited contact with the ground, it is less prone to being dirtied by the soil (which may degrade the appearance or operation of the robot).

The cable suspension system can enable the robot system 100 to be scaled over a range of different size garden plots G and work spaces W (including different heights).

Various aspects of robot systems as described herein can provide additional advantages and flexibility. As noted above, the arrangement of the spool drive system on the robot can permit a relatively small form factor, which can reduce costs associated with packaging, storage and shipping. The onboard solar and/or battery power supply and the wireless communications capability can enable relatively simple deployment, operation and maintenance as well as enhanced durability.

In other embodiments, the motors or other actuators employed to move the robot about the work space are located offboard from the robot. For example, the spools and motors may be mounted on the supports 110 so that the cables are taken up and paid out from the ends of the cables distal from the robot.

While four cables 112A-D are shown and described, according to some embodiments fewer or more than four cables may be used.

As discussed above, in some embodiments the garden plot G is relatively small and may be located in or on a residential property. Aspects of the garden 5 and the robot system 100 may also be scaled up for use in small commercial growing environments, including commercial greenhouses.

In accordance with further embodiments, the mobility platform and other aspects of the robot system 100 can be modified, adapted or used for other uses. For example, the robot system 100 (with appropriate modification to the robot 120, for example) can be installed adjacent a sleeping bed and operated to make the bed. The robot system 100 can used to pick up dirty clothes in a designated work space (e.g., a bedroom) and place them in a laundry receptacle. The robot system 100 can used to pick up trash in a designated work space and place the trash in a waste receptacle. The robot system 100 can be used in a designated work space (such as a kitchen or dining area) to pick up utensils and plates and stack them near a designated location such as a sink or dishwasher. The robot system 100 can be used in a designated work space to perform other basic cleanup tasks with some redesign or accommodation (e.g., in a kitchen environment).

According to some embodiments, the work space W has a volume in the range of from about 24 $ft^3$ to 4800 $ft^2$ and, in some embodiments, from about 96 $ft^2$ to 512 $ft^2$.

EXAMPLE 1

A preliminary prototype robot system was constructed to demonstrate the mobility of a robot as discussed herein. The prototype robot included four motors (corresponding to motors 140A-D) driving four spools (corresponding to spools 142A-D) held in a unifying structure or spool housing (corresponding to the spool housing 130). Each spool was 1.5 inches in diameter and held 12 feet of forty pound test braided fishing line (Spectra). Each line (corresponding to lines 112A-D) exited the spool housing through a slit (corresponding to a slit 136) and then exited the spool housing through a small hole (corresponding to a hole 138) at a predictable location.

The four motors were controlled by an 8-bit microcontroller, which took quadrature encoder feedback from the motors to determine motor motion and provided pulse-width modulation (PWM) signals (at roughly 2 Khz).

The prototype robot system was operated and demonstrated the ability of the robot to move up and down using PWM control and half H-bridge motor drivers. Descent of the robot (i.e., pay out of the lines) was accomplished solely by the weight of the robot pulling the cables from the spools, backdriving the motors. The robot was suspended from four posts (corresponding to the posts 110), roughly four feet by three feet apart and roughly 30 inches from the ground. The prototype robot was operated to rise up to a predetermined height, move in a square pattern, and then descend again.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A garden tending robot system comprising:
 at least one suspension cable;
 an autonomous mobile garden tending robot suspended by the at least one suspension cable in a work space, wherein the garden tending robot system is operative to selectively move the suspended mobile garden tending robot about the work space, the mobile garden tending robot including a camera suspended by the at least one suspension cable to acquire image data from the work space;
 a shearing tool; and
 a controller configured to:
  use the image data from the camera to automatically determine a position of the mobile garden tending robot within the work space;
  direct the mobile garden tending robot to cut portions from plants in the work space using the shearing tool and collect the portions from the work space; and
  notify a user at a remote user terminal when plants in the work space are ready to harvest.

2. The garden tending robot system of claim 1 wherein:
 the shearing tool is movable with the camera; and
 the controller is configured to move the shearing tool about the work space as a function of the image data acquired by the camera.

3. The garden tending robot system of claim 2 wherein the controller is configured to reposition the shearing tool within the work space in three dimensions as a function of the image data acquired by the camera.

4. The garden tending robot system of claim 1 wherein the controller is configured to correlate the image data from the camera with the position of the camera in the work space to generate a map of the image data with respect to the work space.

5. The garden tending robot system of claim 1 including:
 at least one encoder operative to generate tracking signals corresponding to movement of the mobile garden tending robot relative to the at least one suspension cable; and
 wherein the controller is configured to use the tracking signals from the at least one encoder to determine a coarse position of the mobile garden tending robot in the work space, and to correct the coarse position using image data from the camera acquired from the work space.

6. A garden tending robot system for tending a garden, the garden tending robot system comprising:
 at least one suspension cable;
 an autonomous mobile garden tending robot suspended by the at least one suspension cable in a work space including the garden, wherein the garden tending robot system is operative to selectively move the suspended mobile garden tending robot about the work space, the mobile garden tending robot including:
  a robot body carried by the at least one cable;
  a camera mounted on the robot body and suspended by the at least one suspension cable to acquire image data from the work space;
  an implement movable with the camera; and
  an implement actuator operable to selectively move the implement relative to the robot body;
 at least one encoder operative to generate tracking signals corresponding to movement of the mobile garden tending robot relative to the at least one suspension cable; and
 a controller configured to:
  move the implement about the work space as a function of the image data acquired by the camera;
  automatically send a text message to a remote user terminal notifying the user when plants in the garden in the work space are ready to harvest;
  use the tracking signals from the at least one encoder to determine a coarse position of the mobile garden tending robot in the work space to place the mobile garden tending robot in the vicinity of a target in the work space; and
  use image data from the camera acquired from the work space to assess an actual or absolute position of the mobile garden tending robot relative to the target.

7. The garden tending robot system of claim 6 wherein the controller is configured to reposition the implement within the work space in at least three dimensions as a function of the image data acquired by the camera.

8. The garden tending robot system of claim 6 wherein the implement includes a mechanical tool.

9. The garden tending robot system of claim 1 wherein:
 the mobile garden tending robot includes a robot body carried by the at least one cable; and
 the camera is mounted on the robot body.

10. The garden tending robot system of claim 1 wherein the controller is configured to determine landmarks for navigation from the image data.

11. The garden tending robot system of claim 1 wherein:
 the at least one suspension cable includes at least three suspension cables; and
 the mobile garden tending robot is suspended from each of the at least three suspension cables.

12. The garden tending robot system of claim 2 wherein the mobile robot includes:
 a robot body carried by the at least one cable; and
 an implement actuator operable to selectively move the shearing tool relative to the robot body.

13. The garden tending robot system of claim 1 further including at least one of a moisture probe tool and a pH level sensor tool.

14. The garden tending robot system of claim 6 wherein the controller is configured to automatically send a text message to a remote user terminal notifying the user when pests are present in the garden in the work space.

15. The garden tending robot system of claim 1 including a defined garden plot including:
 a growing medium beneath the at least one cable and the mobile garden tending robot; and
 plants growing in the growing medium within the work space.

16. The garden tending robot system of claim 1 wherein:
 the garden tending robot system further includes a water dispenser and a water station, the water station including a supply of water; and the controller is configured to direct the mobile garden tending robot to:
  collect water from the water station using the water dispenser; and
  dispense the collected water onto the garden using the water dispenser.

17. A garden tending robot system for tending a garden, the garden tending robot system comprising:
at least one suspension cable;
an autonomous mobile garden tending robot suspended by the at least one suspension cable in a work space including the garden, wherein the garden tending robot system is operative to selectively move the suspended mobile garden tending robot about the work space, the mobile garden tending robot including:
  a robot body carried by the at least one cable;
  a camera mounted on the robot body and suspended by the at least one suspension cable to acquire image data from the work space;
  an implement movable with the camera; and
  an implement actuator operable to selectively move the implement relative to the robot body;
at least one encoder operative to generate tracking signals corresponding to movement of the mobile garden tending robot relative to the at least one suspension cable; and
a controller configured to:
  move the implement about the work space as a function of the image data acquired by the camera;
  automatically send a text message to a remote user terminal notifying the user when pests are present in the garden in the work space;
  use the tracking signals from the at least one encoder to determine a coarse position of the mobile garden tending robot in the work space to place the mobile garden tending robot in the vicinity of a target in the work space; and
  use image data from the camera acquired from the work space to assess an actual or absolute position of the mobile garden tending robot relative to the target.

18. A garden tending robot system comprising:
at least one suspension cable;
an autonomous mobile garden tending robot suspended by the at least one suspension cable in a work space, wherein the garden tending robot system is operative to selectively move the suspended mobile garden tending robot about the work space, the mobile garden tending robot including a camera suspended by the at least one suspension cable to acquire image data from the work space;
a water dispenser;
a water station the water station including a supply of water; and
a controller configured to:
  use the image data from the camera to automatically determine a position of the mobile garden tending robot within the work space; and
  direct the mobile garden tending robot to: move to the water station; collect water from the water station using the water dispenser; move the water dispenser to desired locations in the work space; and dispense the collected water onto a growing medium of the garden using the water dispenser;
wherein:
  the garden tending robot system further includes a moisture probe tool; and
  the controller is configured to direct the mobile garden tending robot to:
    detect a moisture content of a growing medium of the garden using the moisture probe tool; and
    if a moisture content level of the growing medium detected by the moisture probe tool is too low, to:
      collect water from the water station using the water dispenser; and
      dispense the collected water onto the garden using the water dispenser.

19. A garden tending robot system comprising:
at least one suspension cable;
an autonomous mobile garden tending robot suspended by the at least one suspension cable in a work space, wherein the garden tending robot system is operative to selectively move the suspended mobile garden tending robot about the work space, the mobile garden tending robot including a camera suspended by the at least one suspension cable to acquire image data from the work space;
a water dispenser;
a water station, the water station including a supply of water; and
a controller configured to:
  use the image data from the camera to automatically determine a position of the mobile garden tending robot within the work space; and
  direct the mobile garden tending robot to: move to the water station; collect water from the water station using the water dispenser; move the water dispenser to desired locations in the work space; and dispense the collected water onto a growing medium of the garden using the water dispenser;
wherein:
  the garden tending robot system further includes a tool station holding the water dispenser; and
  the mobile garden tending robot is operable to engage the water dispenser, carry the water dispenser and use the water dispenser to dispense water in the work space, and thereafter return the water dispenser to the tool station.

* * * * *